US011530915B2

(12) United States Patent
Matsuda

(10) Patent No.: US 11,530,915 B2
(45) Date of Patent: Dec. 20, 2022

(54) DIMENSION MEASURING DEVICE, DIMENSION MEASURING METHOD, AND SEMICONDUCTOR MANUFACTURING SYSTEM

(71) Applicant: Hitachi High-Tech Corporation, Tokyo (JP)

(72) Inventor: Kohei Matsuda, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 16/981,973

(22) PCT Filed: Aug. 7, 2019

(86) PCT No.: PCT/JP2019/031076
§ 371 (c)(1),
(2) Date: Sep. 17, 2020

(87) PCT Pub. No.: WO2021/024402
PCT Pub. Date: Feb. 11, 2021

(65) Prior Publication Data
US 2021/0302155 A1 Sep. 30, 2021

(51) Int. Cl.
G01B 15/04 (2006.01)
G06T 7/12 (2017.01)
(Continued)

(52) U.S. Cl.
CPC ............ G01B 15/04 (2013.01); G06K 9/6256 (2013.01); G06T 7/12 (2017.01); G06T 7/60 (2013.01);
(Continued)

(58) Field of Classification Search
CPC ........ G01B 15/04; G01B 7/02; G06K 9/4661; G06K 9/6256; G06T 7/12; G06T 7/60;
(Continued)

(56) References Cited

U.S. PATENT DOCUMENTS

2002/0181776 A1 12/2002 Ikku
2015/0228063 A1 8/2015 Minakawa et al.
(Continued)

FOREIGN PATENT DOCUMENTS

CN 106886998 A 6/2017
CN 109765254 A 5/2019
(Continued)

OTHER PUBLICATIONS

Machine translation for JP 2017-111816, IDS (Year: 2017).*
(Continued)

Primary Examiner — Qian Yang
(74) Attorney, Agent, or Firm — Miles & Stockbridge, P.C.

(57) ABSTRACT

The present disclosure relates to a dimension measuring device that shortens a time required for dimension measurement and eliminates errors caused by an operator. A dimension measuring device that measures a dimension of a measurement target using an input image is provided, in which a first image in which each region of the input image is labeled by region is generated by machine learning, an intermediate image including a marker indicating each region of the first image is generated based on the generated first image, a second image in which each region of the input image is labeled by region is generated based on the input image and the generated intermediate image, coordinates of a boundary line between adjacent regions are obtained by using the generated second image, coordinates of a feature point that defines a dimension condition of the measurement target are obtained by using the obtained coordinates of the boundary line, and the dimension of the measurement target is measured by using the obtained coordinates of the feature point.

10 Claims, 10 Drawing Sheets

(51) Int. Cl.
  *G06T 7/73* (2017.01)
  *G06K 9/62* (2022.01)
  *G06T 7/60* (2017.01)
  *G06V 10/60* (2022.01)

(52) U.S. Cl.
  CPC ............... *G06T 7/73* (2017.01); *G06V 10/60* (2022.01); *G06T 2207/10061* (2013.01); *G06T 2207/30148* (2013.01); *G06T 2207/30204* (2013.01)

(58) Field of Classification Search
  CPC ............ G06T 7/73; G06T 2207/10061; G06T 2207/30148; G06T 2207/30204; G06T 7/62; G06T 7/33; G06T 2207/20081; G01N 23/2251; H01L 21/67069; H01L 22/12
  See application file for complete search history.

(56) References Cited

U.S. PATENT DOCUMENTS

2018/0342078 A1* 11/2018 Watanabe ............. G06T 7/0012
2019/0148108 A1 5/2019 Sun et al.
2020/0056141 A1 2/2020 Ikeuchi et al.

FOREIGN PATENT DOCUMENTS

| JP | 2002350127 A | 12/2002 |
| JP | 201268138 A | 4/2012 |
| JP | 2014081220 A | 5/2014 |
| JP | 2017111816 A | 6/2017 |
| JP | 2019087518 A | 6/2019 |
| JP | 2019119545 A | 7/2019 |
| WO | 2018189877 A1 | 10/2018 |

OTHER PUBLICATIONS

Machine translation for JP 2019-087518, IDS (Year: 2019).*
Search Report dated Oct. 8, 2019, in corresponding International Application No. PCT/JP2019/031076.
Written Opinion dated Oct. 8, 2019, in corresponding International Application No. PCT/JP2019/031076.
Office Action dated Jan. 28, 2022 in Chinese Application No. 201980007814.9.

* cited by examiner

[FIG. 1]
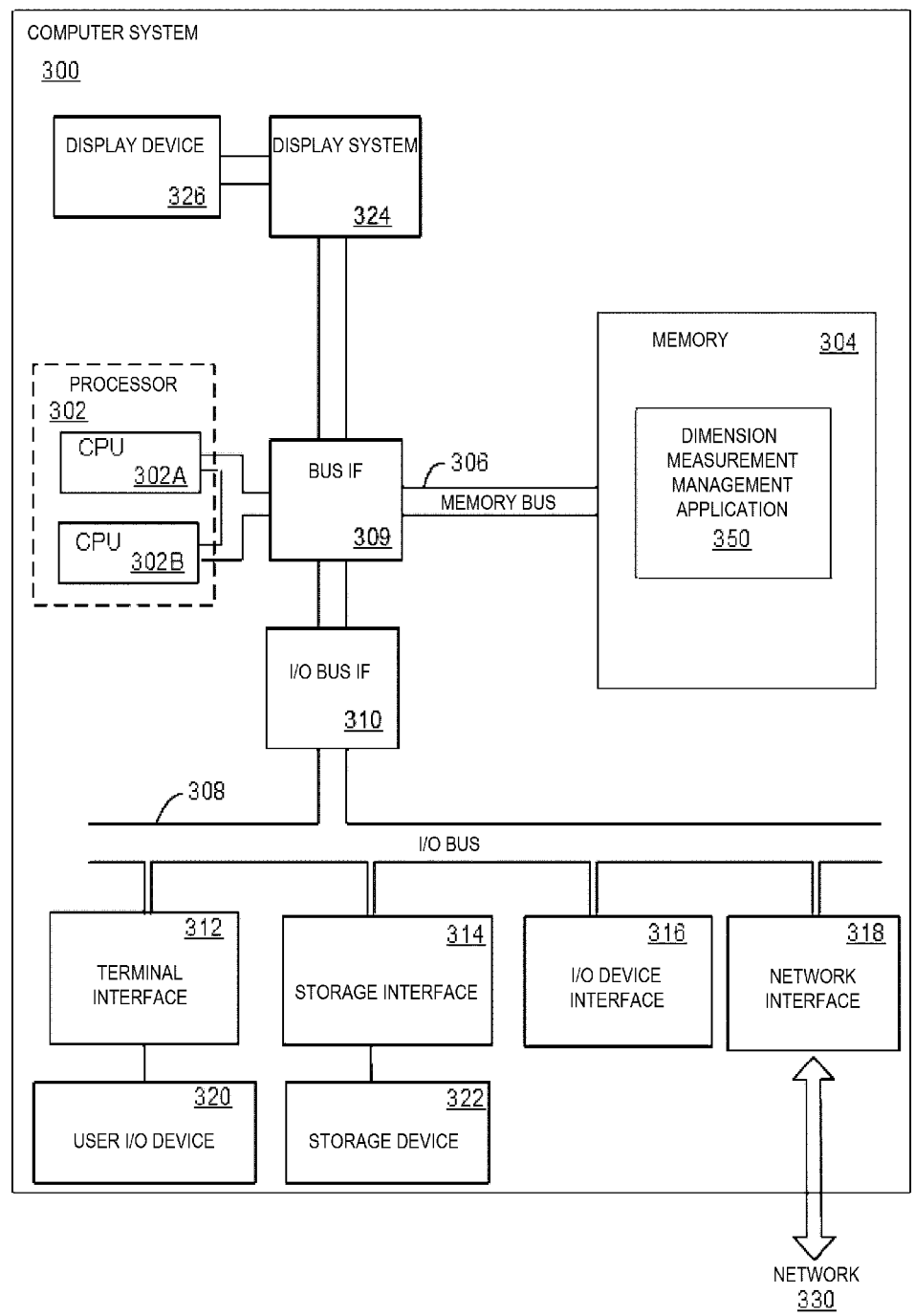

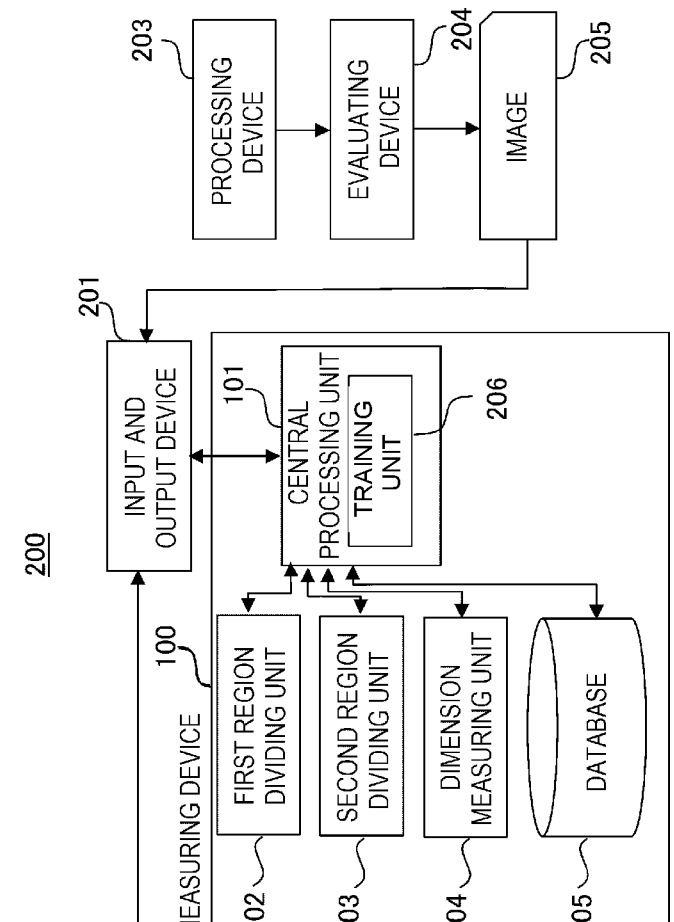
[FIG. 2]

[FIG. 3]
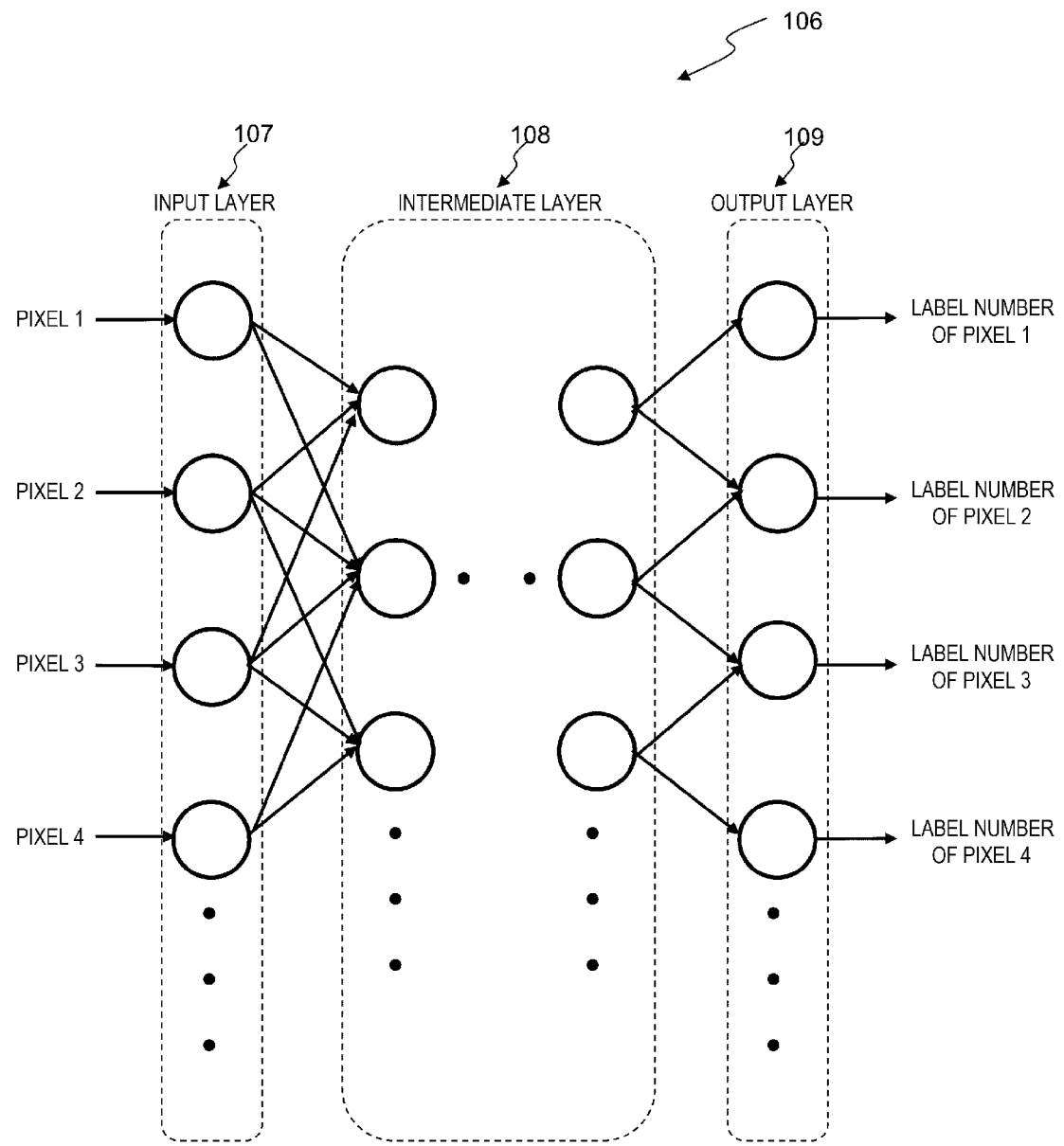

[FIG. 4]
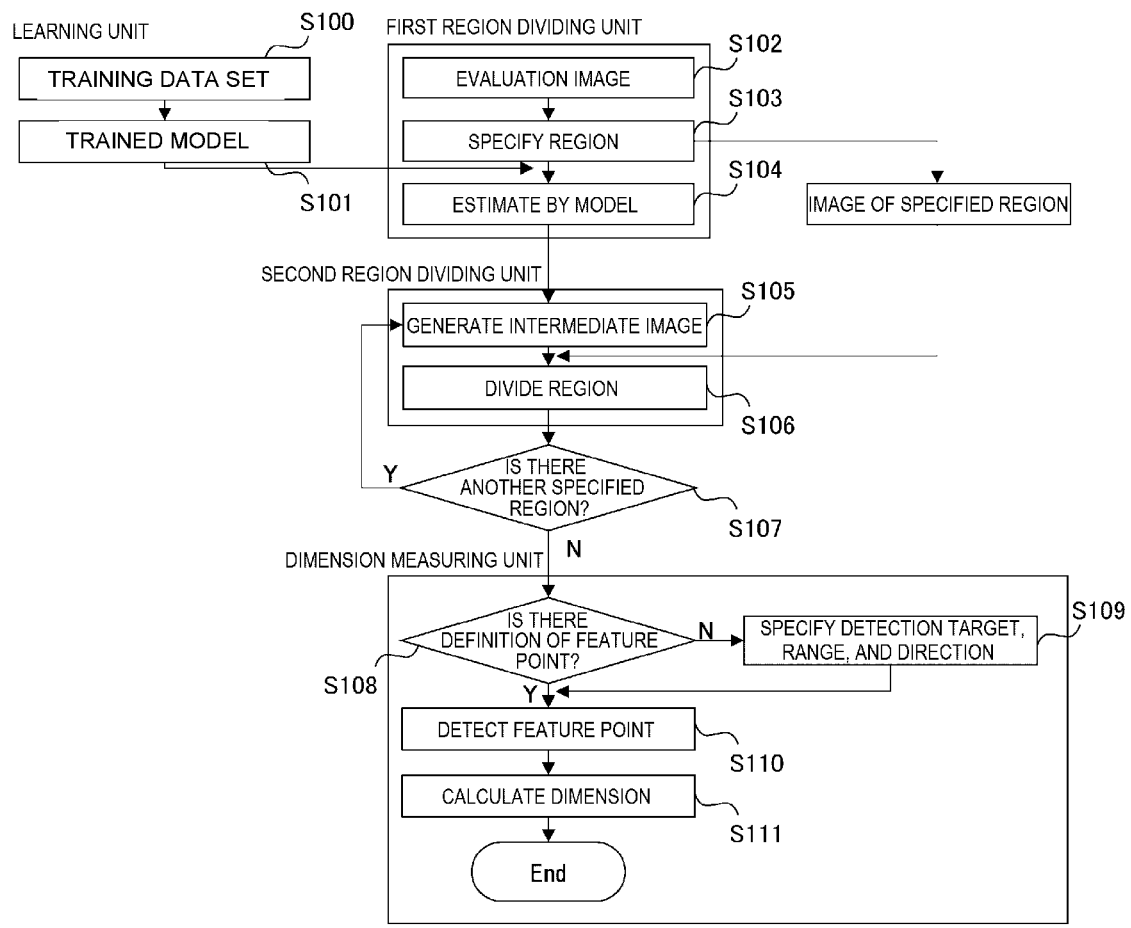

[FIG. 5]
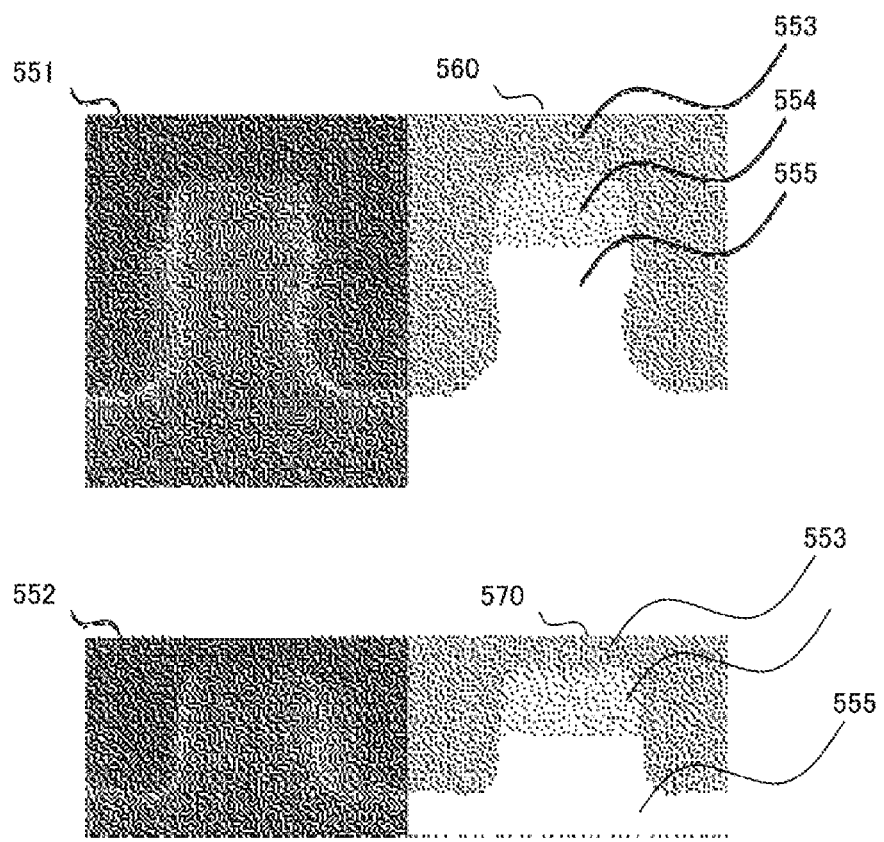

[FIG. 6]
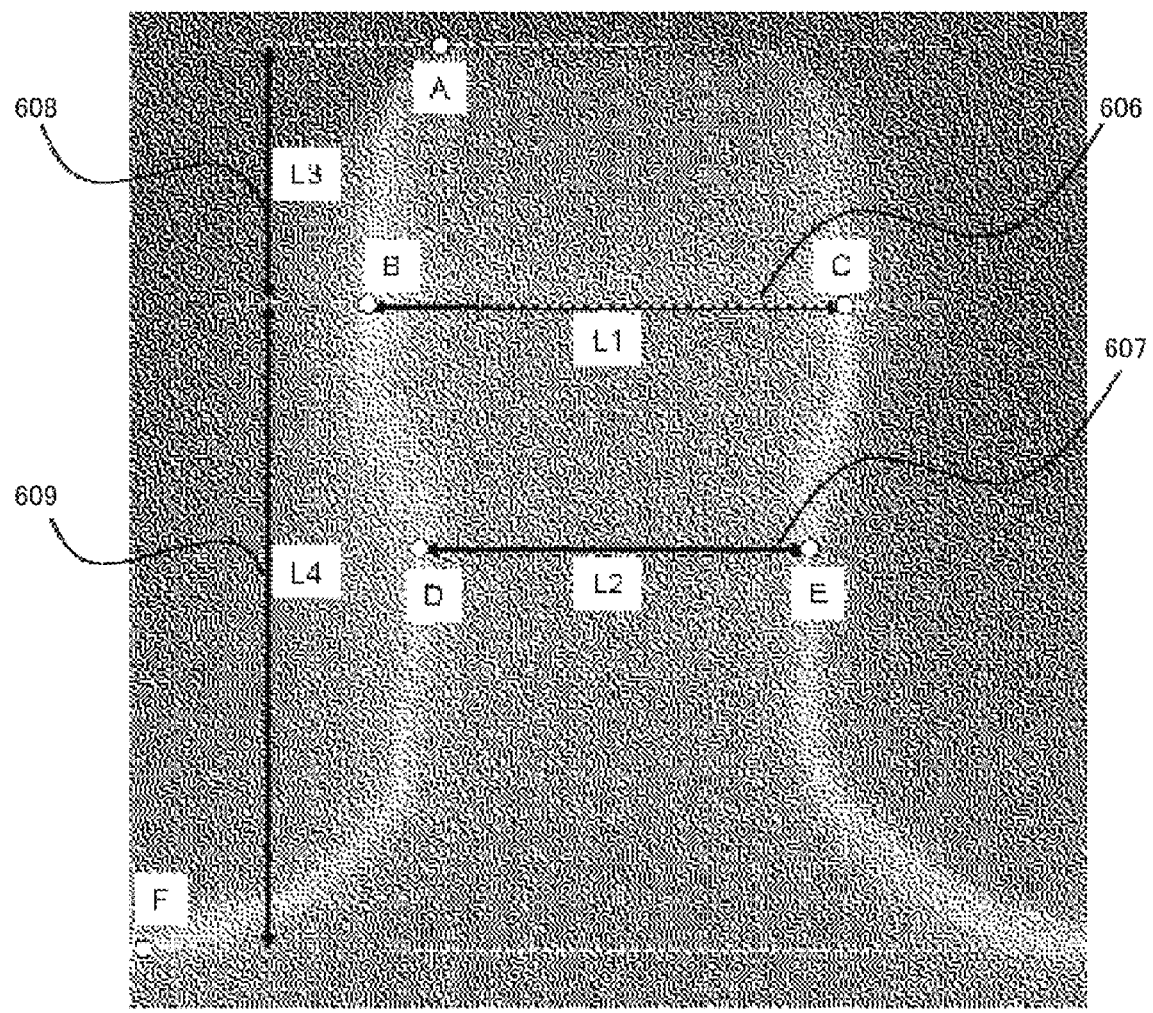

[FIG. 7]
| LABEL NAME | LABEL NUMBER | COLOR |
|---|---|---|
| BACKGROUND | 0 | BLACK |
| MASK | 1 | GRAY |
| SUBSTRATE | 2 | WHITE |
[FIG. 8]
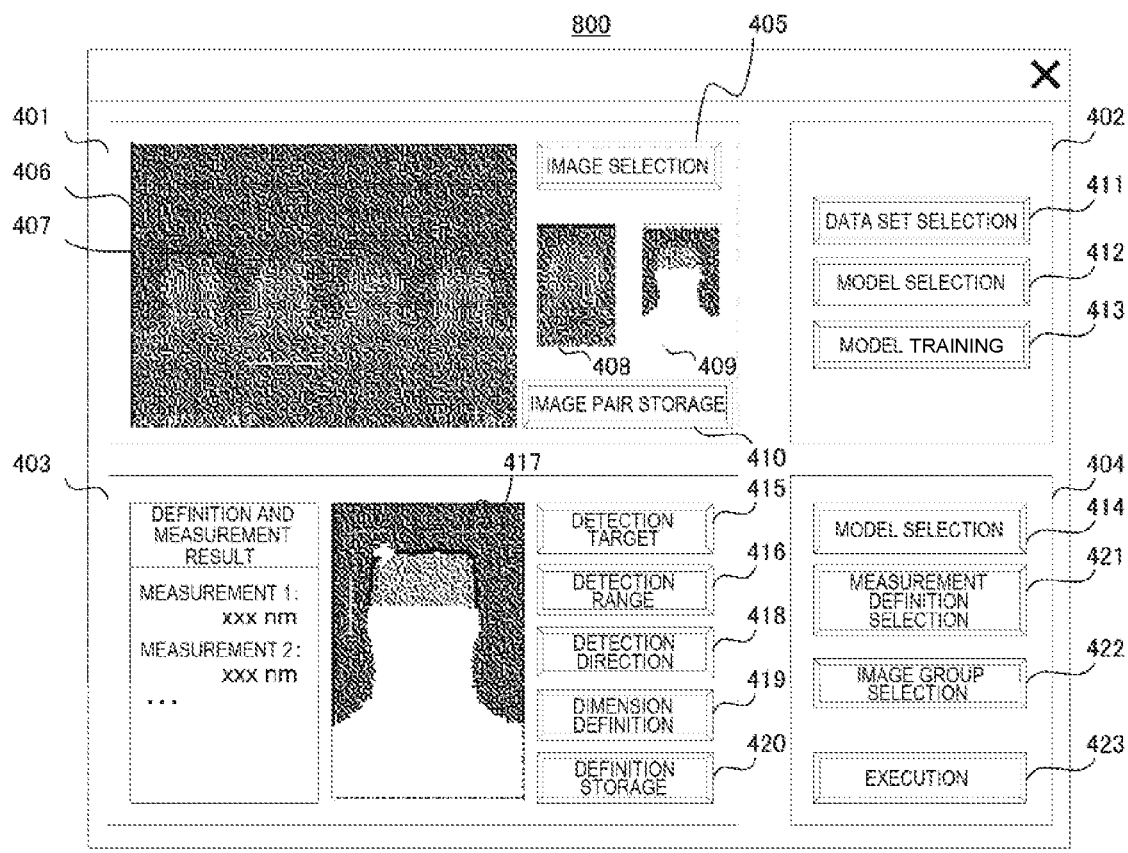

[FIG. 9]
900
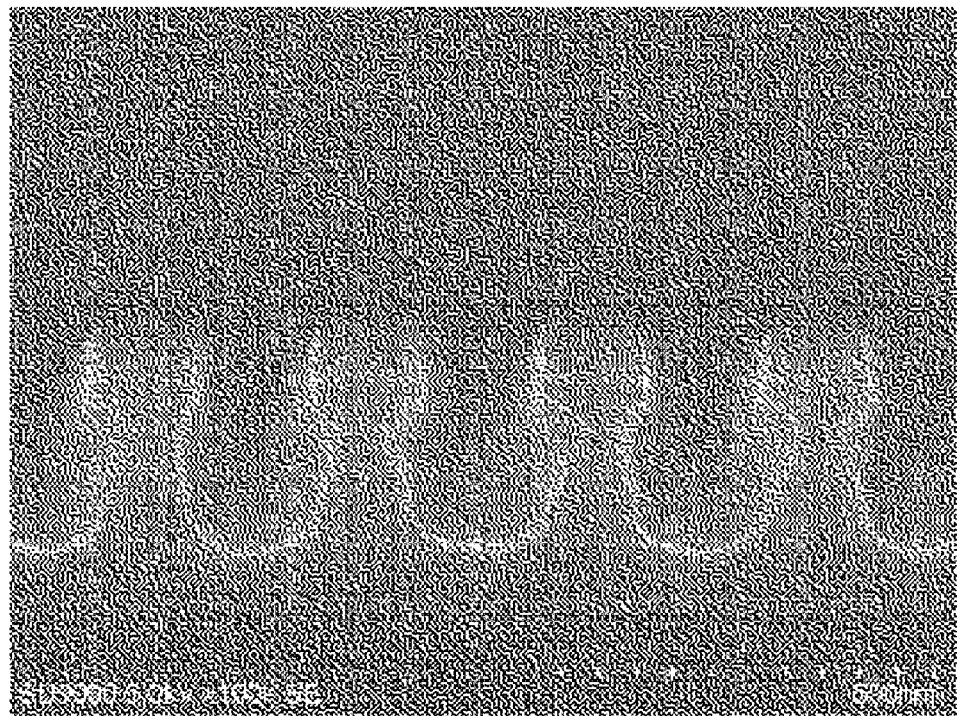

[FIG. 10]
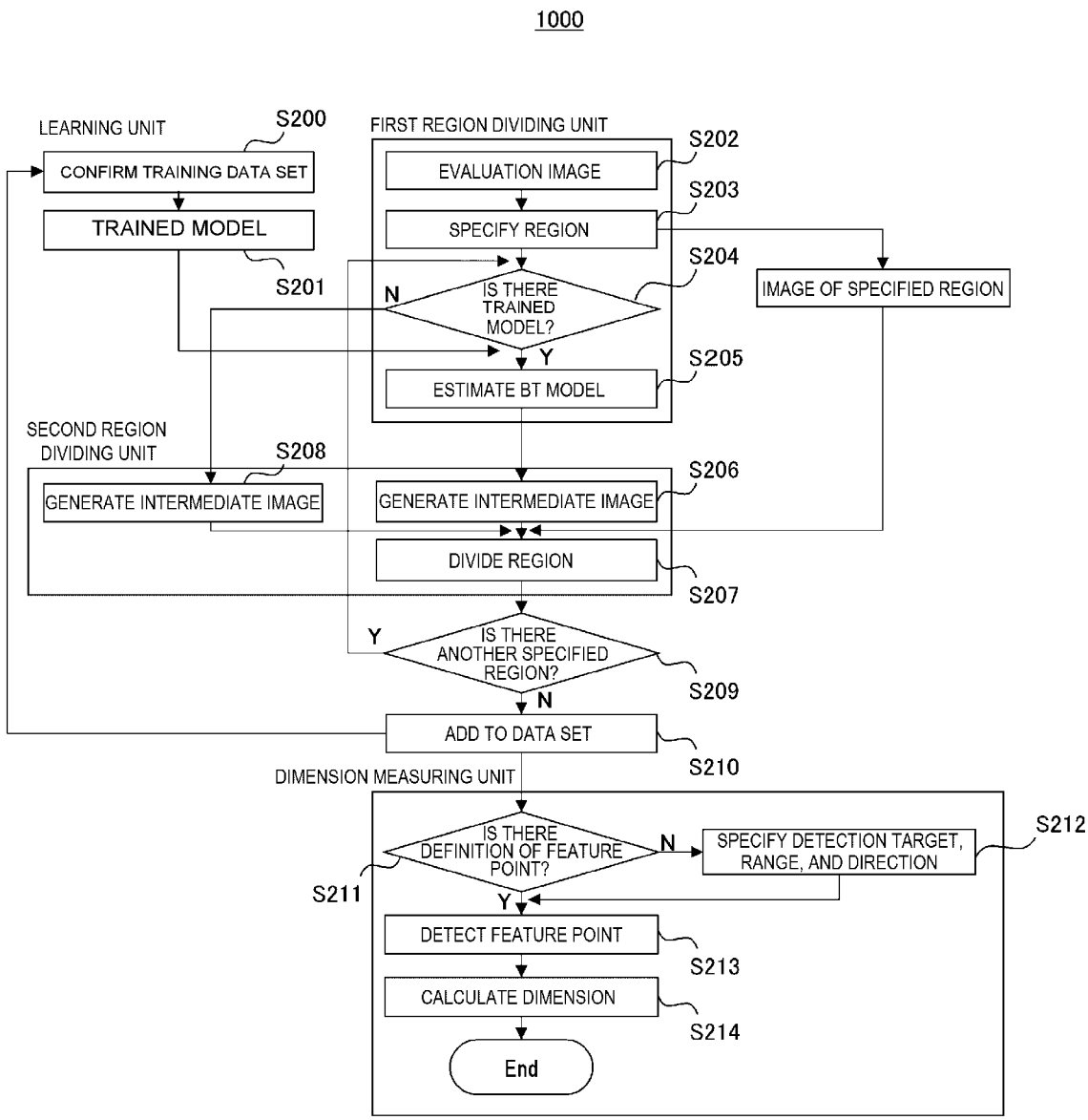

[FIG. 11]
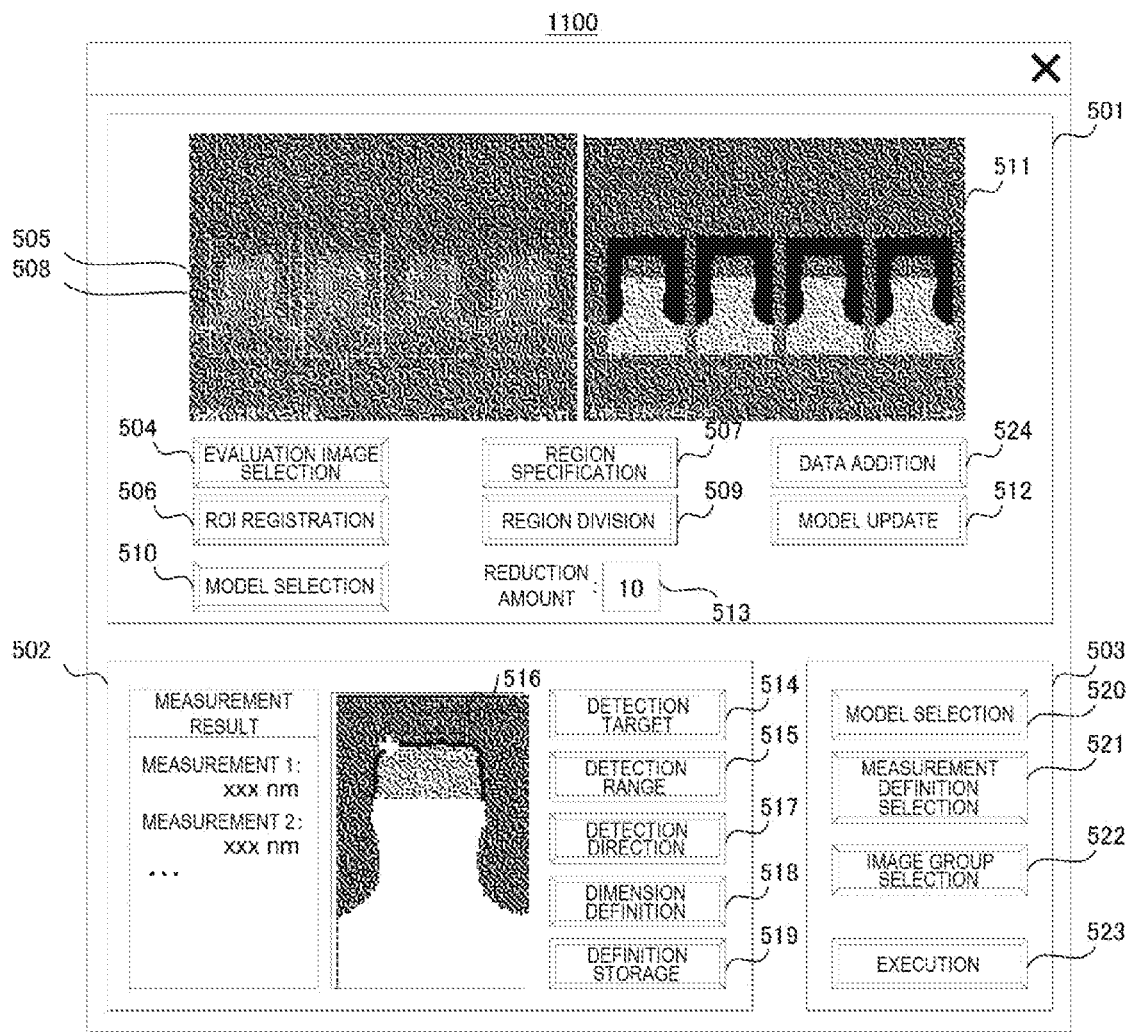

DIMENSION MEASURING DEVICE, DIMENSION MEASURING METHOD, AND SEMICONDUCTOR MANUFACTURING SYSTEM

TECHNICAL FIELD

The present invention relates to a dimension measuring device, a dimension measuring method, and a semiconductor manufacturing system.

BACKGROUND ART

In recent years, in order to improve performance of a semiconductor device, a new material is introduced into the semiconductor device, and a structure of the semiconductor device is also becoming three-dimensional and complicated. Further, current processing of an advanced semiconductor device requires nanometer-level accuracy. Therefore, a semiconductor processing device needs to be able to process various kinds of materials into various shapes with extremely high accuracy. Then, in order to process various kinds of materials with extremely high accuracy, it is necessary to objectively measure a shape of each material and quantify the shape to optimize the processing method. On the other hand, as the structure of a semiconductor device becomes three-dimensional and complicated, the need for measurement has dramatically increased, and there is an increasing demand for multipoint measurement with high accuracy in a short time.

In the measurement for the high accurate processing, generally, an image of a cross section of a sample to be processed is obtained by scanning electron microscope (SEM) or transmission electron microscope (TEM), and a shape of the structure is manually measured. However, when the manual measurement is applied to an advanced process, a structure of the sample to be processed becomes complicated and the number of measurement points per image also increases, and therefore, dimension extraction performed manually is reaching the limit.

In addition, in the manual measurement, operator dependence occurs in a measured value. Further, even in an image in which unit patterns of lines and spaces are repeated, each individual pattern is measured one by one, so that a human error is added to a statistic of the measured values in addition to process variation. Further, when a measurement place more important than an initially planned measurement place is found in the course of optimizing processing conditions, it is necessary to re-measure all the images that have already been measured.

If dimension measurement can be automated for these problems, a time required for the measurement can be greatly shortened and a processed shape can be grasped more accurately.

Various solutions have been proposed for these problems.

For example, WO-2018-189877 (PTL 1) describes that "Provided is a charged particle beam device that calculates the features of cells from a cell observation image more objectively and accurately and evaluates the cells. A charged particle beam device comprises: an image acquisition unit 18 that acquires an image of a cell; an outline extraction unit 19 that extracts the outline of the image; a feature quantity calculation unit 20 that calculates a morphological feature quantity of the outline on the basis of the outline, and calculates the feature quantity of internal structures, such as the cytoplasm, that are included in an inner region of the outline; and an assessment unit 21 that assesses the quality and/or the functionality of the cell on the basis of the feature quantity. The charged particle beam device is capable of objectively and accurately evaluating the quality and/or the functionality of cells included in a captured image."

Further, JP-A-2012-68138 (PTL 2) describes that "A pattern cross-sectional image is subjected to image processing and outline line coordinate data of a cross section is extracted; coordinate values corresponding to upper and lower portions of a pattern are extracted from the outline line coordinate data; and a height of the pattern, coordinate values of two points in a measurement range, and a height of the measurement range are calculated. A luminance distribution signal in an x direction corresponding to the coordinate values of the two points is obtained; and a signal component in a range corresponding to a white shadow portion unique to a cross-sectional SEM image is removed from the signal. A cross-correlation method is applied to the signal; a distance between two signals is calculated; and a sidewall angle is calculated."

Further, JP-A-2002-350127 (PTL 3) describes that "a step of setting an edge detection reference line by specifying an edge detection range and the number of edge points for each side of a pattern in a microscope image; a step of searching from a vertical direction with respect to the set edge detection reference line and extracting an edge point which is a luminance change point from image information; a step of calculating a line that approximates each side of the pattern based on position information of multiple edge points; and a step of specifying an intersection of two lines based on approximate line information of each side of the pattern, a specific point calculated based on multiple intersections, an angle between two straight lines, and a shape of the pattern based on a distance between the specified two points."

CITATION LIST

Patent Literature

PTL 1: WO-2018-189877
PTL 2: JP-A-2012-68138
PTL 3: JP-A-2002-350127

SUMMARY OF INVENTION

Technical Problem

In the above-described PTL 1, it is premised that an outline of an object in the image is appropriately extracted. However, in shape measurement of a semiconductor device structure, it is difficult to appropriately extract an outline in many cases. As an example, in a case of cross-sectional SEM, since secondary electrons are emitted from a sample surface in a depth direction of a cross section being observed, white shadows may occur at an interface between a region that is a vacuum and a region of the semiconductor device. Then, it may be difficult to extract an outline line due to such a white shadow. Therefore, even if the method described in PTL 1 is applied to the shape measurement of the semiconductor device structure, good measurement results may not be obtained.

In both PTL 2 and PTL 3, the method for specifying the edge point and the outline of the object by a manual method using a luminance value of an image is described, but since the method involves visual operation, the operator dependence still remains. Further, the operator works while looking at the images one by one, which requires a working time. In addition, when it is desired to add or change a dimension measurement place at a later stage, it is necessary to re-measure visually from the image.

Further, when an object included in a cross-sectional SEM image (or cross-sectional TEM image) is measured, there are problems that brightness is different for each image, or the behind structure is reflected which is not necessary for dimension measurement, and a boundary between interfaces of different materials is unclear for desired dimension measurement. Therefore, in the methods of PTL 2 and 3 using an edge detection method based only on the luminance value, it is necessary to visually determine and specify an interface position.

Therefore, none of PTLs 1 to 3 considers automatically providing a highly accurate measurement result of the cross-sectional SEM image (or cross-sectional TEM image). Therefore, by applying an image recognition technique using machine learning, especially deep learning, complete automatic measurement that does not require visual adjustment is implemented, and a method for extracting an outline of an object by recognizing a region of each individual object reflected in an image rather than a local luminance distribution is desired.

On the other hand, there are problems in the image recognition technique using the deep learning. That is, there is a measurement model dependence due to a training data set and a trained model. When different training data sets or different trained models are used, even if input images are the same, each inference result is basically different, and therefore, the inference results cannot be compared directly. That is, there is a contradiction that the comparison cannot be performed for the above-described reason, although the measurement is performed for quantitatively comparing the different images.

Therefore, an object of the invention is to provide a measuring method, which reduces a dimension measurement time and does not include errors caused by an operator and deep learning by using a combination of machine learning (for example, an image recognition technique by the deep learning) and an image processing technique based on luminance and automatically measuring a desired dimension based on a cross-sectional SEM.

Solution to Problem

In order to solve the above problems, one of representative dimension measuring devices of the invention is a dimension measuring device that measures a dimension of a measurement target using an input image, in which a first image in which each region of the input image is labeled by region is generated by machine learning, an intermediate image including a marker indicating each region of the first image is generated based on the generated first image, a second image in which each region of the input image is labeled by region is generated based on the input image and the generated intermediate image, coordinates of a boundary line between adjacent regions are obtained by using the generated second image, coordinates of a feature point that defines a dimension condition of the measurement target are obtained by using the obtained coordinates of the boundary line, and the dimension of the measurement target is measured by using the obtained coordinates of the feature point.

Advantageous Effect

According to the invention, a measuring method, which reduces a dimension measurement time and does not include errors caused by an operator and deep learning by using a combination of machine learning (for example, an image recognition technique by the deep learning) and an image processing technique based on luminance and automatically measuring a desired dimension based on a cross-sectional SEM, can be provided.

Problems, configurations, and effects other than those described above become obvious from the following description of embodiments.

BRIEF DESCRIPTION OF DRAWINGS

FIG. 1 is a block diagram of a computer system for implementing an embodiment of the invention.

FIG. 2 is a diagram showing an example of the configuration of a semiconductor manufacturing system according to the embodiment of the invention.

FIG. 3 is a diagram showing an example of the configuration of a neural network for a semantic segmentation model according to the embodiment of the invention.

FIG. 4 is a flowchart showing a flow of a dimension measuring method according to Embodiment 1 of the invention.

FIG. 5 is a diagram showing an example of annotation data used for training data of an object detection model according to Embodiment 1 of the invention.

FIG. 6 is a diagram showing correspondence relationships among dimension places and feature points according to Embodiment 1 of the invention.

FIG. 7 is a table showing a correspondence relationship among a label name, a label number, and a color in annotation data used for training data of a semantic segmentation model according to Embodiment 1 of the invention.

FIG. 8 is a diagram showing an example of a graphical user interface (GUI) screen displayed on an input and output device according to Embodiment 1 of the invention.

FIG. 9 is a diagram showing an example of a test image according to the embodiment of the invention.

FIG. 10 is a flowchart showing a flow of a dimension measuring method according to Embodiment 2 of the invention.

FIG. 11 is a diagram showing an example of a graphical user interface (GUI) screen displayed on an input and output device according to Embodiment 2 of the invention.

DESCRIPTION OF EMBODIMENTS

Hereinafter, embodiments of the invention will be described with reference to the drawings. The invention is not limited to the embodiments. Further, in the description of the drawings, the same parts are designated by the same reference numerals.

A dimension measuring device according to the invention includes a first region dividing unit, a second region dividing unit, and a dimension measuring unit. The first region dividing unit uses an image recognition model that distinguishes each region and background in a processed structure of an image of a measurement object. The image recognition model is trained by using a cross-sectional SEM image and an annotation image (that is, training data) showing a result of each correctly labeled region of the cross-sectional SEM image, and learns a method for labeling each region.

The second region dividing unit generates, based on labeled images output from the first region dividing unit, an image including a marker indicating each region in a first image as an intermediate image, and generates, based on the marker and the cross-sectional SEM image that is an input image, an image labeled by region based on luminance information of the input image.

The dimension measuring unit calculates coordinates of a region boundary line between adjacent regions based on the image divided by region, and calculates coordinates of a feature point that defines dimension conditions of a measurement target for each region of interest (ROI) using dimension definition based on measurement conditions such as a detection target, a detection range, and a detection direction of the feature point, so as to measure a dimension at a predetermined place. In other words, the coordinates of the feature point are obtained based on the detection target of the feature point defined with respect to the coordinates of the boundary line, the detection range of the feature point defined with respect to the coordinates of the boundary line, and the detection direction of the feature point defined with respect to the coordinates of the boundary line. Then, the dimension of the predetermined point is measured based on the obtained coordinates of the feature point.

As described above, it is possible to automatically measure a predetermined dimension value based on the cross-sectional SEM image without a need for visual adjustment by an operator.

Embodiments of the invention will be described below with reference to the accompanying drawings.

First, with reference to FIG. 1, a computer system 300 for implementing the embodiments of the present disclosure will be described. Mechanisms and devices of the various embodiments disclosed herein may be applied to any suitable computing system. Main components of the computer system 300 include one or more processors 302, a memory 304, a terminal interface 312, a storage interface 314, an I/O (input and output) device interface 316, and a network interface 318. These components may be interconnected via a memory bus 306, an I/O bus 308, a bus interface unit 309, and an I/O bus interface unit 310.

The computer system 300 may include one or more general purpose programmable central processing units (CPUs) 302A and 302B, which are collectively referred to as the processor 302. In one embodiment, the computer system 300 may include a plurality of processors, and in another embodiment, the computer system 300 may be a single CPU system. Each processor 302 executes an instruction stored in the memory 304 and may include an onboard cache.

In one embodiment, the memory 304 may include a random access semiconductor memory, a storage device, or a storage medium (either volatile or non-volatile) for storing data and programs. The memory 304 may store all or a part of a program that implements a function described herein, a module, and a data structure. For example, the memory 304 may store a dimension measurement management application 350. In one embodiment, the dimension measurement management application 350 may include an instruction or a description of executing a function described below on the processor 302.

In one embodiment, the dimension measurement management application 350 may be implemented in hardware via semiconductor devices, chips, logic gates, circuits, circuit cards, and/or other physical hardware devices in place of processor-based systems or in addition to processor-based systems. In one embodiment, the dimension measurement management application 350 may include data other than the instruction or the description. In one embodiment, a camera, a sensor, or the other data input device (not shown) may be provided to communicate directly with the bus interface unit 309, the processor 302, or the other hardware of the computer system 300.

The computer system 300 may include the bus interface unit 309 that performs communication among the processor 302, the memory 304, a display system 324, and the I/O bus interface unit 310. The I/O bus interface unit 310 may be connected to the I/O bus 308 for transferring data to and from various I/O units. The I/O bus interface unit 310 may communicate with the plurality of I/O interface units 312, 314, 316, and 318, which are also known as I/O processors (IOPs) or I/O adapters (IOAs), via the I/O bus 308.

The display system 324 may include a display controller, a display memory, or both. The display controller can provide data of a video, an audio, or both to a display device 326. Further, the computer system 300 may also include devices such as one or more sensors configured to collect data and provide the data to the processor 302.

For example, the computer system 300 may include a biometric sensor that collects heart rate data and stress level data, an environmental sensor that collects humidity data, temperature data, and pressure data, and a motion sensor that collects acceleration data and exercise data, and the like. Other types of sensors can also be used. The display system 324 may be connected to the display device 326 such as a single display screen, a television, a tablet, or a portable device.

The I/O interface unit has a function of communicating with various storages or I/O devices. For example, the terminal interface unit 312 can be attached to a user I/O device 320 such as a user output device, for example, a video display device, a speaker television, or a user input device, for example, a keyboard, a mouse, a keypad, a touchpad, a trackball, a button, a light pen, or the other pointing device. A user may input data or instructions to the user I/O device 320 and the computer system 300, and receive output data from the computer system 300 by using the user interface and operating the user input device. The user interface may be displayed on a display device via the user I/O device 320, played by a speaker, or printed via a printer, for example.

The storage interface 314 can be attached to one or more disk drives or a direct access storage device 322 (usually a magnetic disk drive storage device, but may be an array of a disk drive configured to appear as a single disk drive or the other storage device). In one embodiment, the storage device 322 may be implemented as any secondary storage device. Contents of the memory 304 may be stored in the storage device 322 and read from the storage device 322 as needed. The I/O device interface 316 may provide an interface to the other I/O device such as a printer, a fax machine, and the like. The network interface 318 may provide a communication path for the computer system 300 and the other device to communicate with each other. The communication path may be a network 330, for example.

In one embodiment, the computer system 300 may be a device that receives a request from the other computer system (client), which does not include a direct user interface, such as a multi-user mainframe computer system, a single user system, or a server computer. In other embodiments, the computer system 300 may be a desktop computer, a portable computer, a notebook personal computer, a tablet computer, a pocket computer, a phone, a smartphone, or any other suitable electronic device.

Embodiment 1

In the present embodiment, in order to extract coordinates of a boundary line between the processed structure and the background or a boundary line of an interface between different materials in the image of the measurement object, a ROI detection algorithm, a semantic segmentation model, and a Watershed algorithm are used in combination.

Here, the semantic segmentation model is a machine learning model that performs a process of associating each pixel of the image with a class label (such as "flower", "person", "road", "sky", "ocean", and "car"). In a training (that is, training) step in the semantic segmentation model, a cross-sectional SEM image that is input data and an annotation image color-coded for each region that is output data are given as training data to cause the semantic segmentation model to learn a shape of the region.

In an inference step that follows the training step, a dimension measuring device according to the invention detects a region of interest (ROI) by using a ROI detection algorithm on a given input image, and estimates a color-coded image for each region by using the trained semantic segmentation model on the detected ROI. Thereafter, the dimension measuring device generates an intermediate image including markers indicating each region in the image based on an estimation result, and outputs the image color-coded for each region by inputting the markers provided in the intermediate image and the detected ROI into the Watershed algorithm. Next, in a measuring step, the dimension measuring device automatically measures a dimension of a desired place based on coordinates of a region boundary line obtained from the image color-coded for each region.

Next, with reference to FIG. 2, a system of the dimension measuring device according to the embodiment of the invention will be described.

FIG. 2 is a diagram showing an example of the configuration of a semiconductor manufacturing system 200 according to the embodiment of the invention. As shown in FIG. 2, the semiconductor manufacturing system 200 mainly includes a dimension measuring device 100, an input and output device 201, a processing device 203, and an evaluating device 204. These devices are connected via a communication network (not shown) such as Internet.

The dimension measuring device 100 mainly includes a central processing unit 101, a first region dividing unit 102, a second region dividing unit 103, a dimension measuring unit 104, and a database 105. The dimension measuring device 100 receives input information 202 such as definition of a feature point and a dimension, magnification, and a training data set which are input via the input and output device 201, and a cross-sectional image 205, and then outputs a measurement result to the input and output device 201 after performing processing of measuring a predetermined dimension on the cross-sectional image 205 by processing described later.

Further, as shown in FIG. 2, the central processing unit 101 includes a training unit 206. The training unit 206 is a functional unit that manages training (that is, training) of a machine learning model of the first region dividing unit 102 and the second region dividing unit 103.

The input and output device 201 includes an input and output interface such as a GUI, and a storage medium reading device such as a card reader, and inputs the input information 202 such as the definition of a feature point and a dimension, magnification, and a training data set to the dimension measuring device 100. Further, the input and output device 201 receives the cross-sectional image 205 of the measurement object as an input image from the evaluating device 204, and transmits the input image to the central processing unit 101. The input and output device 201 may be, for example, a keyboard, a mouse, a display, a touch panel, a storage medium reading device, and the like. Alternatively, the input and output device 201 may be configured to display a measurement result transmitted from the dimension measuring device 100 to the user. In this case, the input and output device 201 may display the measurement result on the display or write the measurement result to a file.

The processing device 203 is a device that processes (for example, processing) a semiconductor or a semiconductor device including a semiconductor. A content of the processing of the processing device 203 is not particularly limited. For example, the processing device 203 may be a lithographic device, a film forming device, a pattern processing device, or the like. More specifically, the lithographic device includes an exposure device, an electron beam drawing device, an X-ray drawing device, and the like. Further, the film forming device includes a chemical vapor deposition (CVD), a physical vapor deposition (PVD), a vapor deposition device, a sputtering device, a thermal oxidation device, and the like. Further, the pattern processing device includes, for example, a wet etching device, a dry etching device, an electron beam processing device, and a laser processing device. The processing device 203 processes the semiconductor or the semiconductor device based on input processing conditions, and transports the processed semiconductor or semiconductor device to the evaluating device 204.

The evaluating device 204 captures a cross section of the semiconductor or the semiconductor device processed by the processing device 203, and obtains the cross-sectional image 205 representing a result of the processing. The evaluating device 204 may be, for example, a processing dimension measuring device using an SEM, a TEM, and an optical monitor. Further, a part of the semiconductor or the semiconductor device processed by the processing device 203 may be taken out as a fragment, and the fragment may be transported to the evaluating device 204 for measurement. The obtained cross-sectional image 205 is transmitted to the input and output device 201.

Next, with reference to FIG. 3, the configuration of a neural network for the semantic segmentation model according to the embodiment of the invention will be described.

FIG. 3 is a diagram showing an example of the configuration of a neural network 106 for the semantic segmentation model according to the embodiment of the invention. The neural network 106 shown in FIG. 3 is one for performing semantic segmentation used in the above-described first region dividing unit (for example, the first region dividing unit 102 shown in FIG. 2). As shown in FIG. 3, the neural network 106 includes an input layer 107, an intermediate layer 108, and an output layer 109.

The neural network 106 propagates pixel information (for example, pixel information of the cross-sectional SEM image that is the input image), which is input to the input layer 107, to the intermediate layer 108 and the output layer 109 in order, and outputs a label number of a region to which each pixel belongs by performing calculation. In the intermediate layer 108, a number of convolutional layers, dropout layers, and the like are repeated. A specific layer structure depends on an adopted model. During the training, parameters of an intermediate layer are adjusted such that an error between the label of each pixel output by the neural network 106 and annotation data indicating a correct label is minimized.

In the present embodiment, the example of the configuration using the neural network 106 is described, but the invention is not limited thereto, and a configuration using a machine learning model such as a decision tree may be used.

Next, with reference to FIG. 4, a dimension measuring method according to Embodiment 1 of the invention will be described.

FIG. 4 is a flowchart showing a flow of a dimension measuring method 400 according to Embodiment 1 of the invention.

First, a training unit (for example, the training unit 206 shown in FIG. 2) generates the input information 202 including a training data set or the like to be input to a dimension measuring device (for example, the dimension measuring device 100 shown in FIG. 2). Specifically, in step S100, the training unit generates a cross-sectional SEM image that is input data received from an evaluating device (for example, the evaluating device 204 shown in FIG. 2) through an input and output device (for example, the input and output device 201 shown in FIG. 2), and an annotation data image used for the semantic segmentation model as the training data set, and stores the training data set in a database (for example, the database 105 shown in FIG. 2).

Next, in step S101, the training unit transfers the training data set and a machine learning model from the database to the first region dividing unit (for example, the first region dividing unit 102 shown in FIG. 2), and causes the machine learning model to learn. Parameters of the trained model are returned and stored in the database.

The "machine learning model" here is described by taking a neural network having a convolutional layer, a dropout layer, and the like as an example, but the invention is not limited thereto, and may be a machine learning model such as a decision tree.

Next, in step S102, the first region dividing unit receives the input image, in which the measurement object is reflected, from the input and output device.

Next, in step S103, the first region dividing unit obtains the machine learning model and trained parameters from the database, and specifies a target region in the input image by using the ROI detection algorithm based on the obtained model and trained parameters.

Here, an example of using Template Matching as the ROI detection algorithm will be described, but the invention is not limited thereto, and it is also possible to use a deep learning model, such as a region proposal network (RPN), and a machine learning model based on a feature amount such as a Haar-Like feature classifier.

Next, in step S104, the first region dividing unit estimates the detected ROI using the semantic segmentation model.

Next, in step S105, the second region dividing unit (for example, the second region dividing unit 103 shown in FIG. 2) generates an image including a marker indicating each region in the input image as an intermediate image based on an estimation result generated in step S104. Here, the "marker" is information representing a region with confirmation and a region without confirmation in the so-called Watershed algorithm.

The estimation result obtained by semantic segmentation performed in the first region dividing unit is array information labeled for each pixel, and the second region dividing unit generates a marker according to the number of label types and generates the intermediate image.

Specifically, when there is one label type, that is, when the estimation result obtained by the semantic segmentation model is determined to be the same for all pixels, since there is no interface to be detected in the detected ROI, the processing proceeds to step S106.

When the number of label types is two, it is determined that the image is an image in which a foreground and a background are separated. A new boundary region is generated near a boundary line between the foreground and the background by performing predetermined region reduction processing on regions of the foreground and the background, the reduced foreground and background are defined as regions with confirmation, and the newly generated boundary region is defined as a region without confirmation. Accordingly, a good region division result can be obtained when the Watershed algorithm is applied.

Here, in the region reduction processing, an algorithm for reducing ten pixels from the outermost periphery of each region may be used, but the invention is not limited thereto.

Next, in step S106, the second region dividing unit performs region division by the Watershed algorithm based on the image generated in step S103 and in which the target region is specified, and the intermediate image generated in step S105.

Here, when the number of label types is three or more, the second region dividing unit treats an aimed label as the foreground and treats all other labels as the background, and the same processing as in the case where the number of label types is two is performed until the aimed label is covered.

In the present embodiment, the Watershed algorithm is used as a method of region division, but the invention is not limited thereto, and it is also possible to use an algorithm such as a Graph cut algorithm that performs region division based on luminance information instead.

Next, in step S107, the second region dividing unit determines whether there is another specified region in the input image. When there is another specified region in the input image, the second region dividing unit repeats the above-described processing for the remaining specified region. Specifically, the second region dividing unit performs the generation of the marker indicating the intermediate image and the region division on each specified region, and performs until all the specified regions are covered.

In a case where there is no other specified region in the input image, the processing proceeds to step S109.

Next, in step S108, the dimension measuring unit confirms whether definition of a feature point and a dimension that defines dimension conditions of a measurement target is stored in advance in the database. If these pieces of information are not stored in the database, the dimension measuring unit proceeds to step S109 and specifies a region label that is a detection target, a detection range, and a detection direction.

When specifying a plurality of places, the dimension measuring unit specifies definition for each feature point.

Next, in step S110, the dimension measuring unit performs detection of the feature point based on the specified definition.

Next, in step S111, the dimension measuring unit performs processing of measuring a dimension of the measurement object based on the obtained feature point, and converts the measured dimension information from a pixel unit to an actual unit (for example, International System of Units).

Accordingly, it is possible to automatically generate a highly accurate measurement result for the cross-sectional SEM image (or cross-sectional TEM image).

Next, with reference to FIG. 5, annotation data used for training data of an object detection model according to Embodiment 1 of the invention will be described.

Hereinafter, a case where the above-described processing device is an etching device and the ROI is a pattern portion will be described as an example.

FIG. 5 is a diagram showing an example of the annotation data used for the training data of the object detection model according to Embodiment 1 of the invention. More specifically, FIG. 5 shows a cross-sectional SEM image 551 and annotation data 560 in which regions of the cross-sectional SEM image 551 are correctly labeled, and a cross-sectional SEM image 552 and annotation data 570 in which regions of the cross-sectional SEM image 552 are correctly labeled.

The difference between the cross-sectional SEM image 551 and the cross-sectional SEM image 552 is that a processing method in a processing device (for example, the processing device 203 shown in FIG. 2) is different. Therefore, the ROI specifies the same pattern portion, and even when the images have the same reduction ratio, a size of the ROI may differ depending on the input image. In order to keep the size of the ROI constant, before inputting an input data set to the semantic segmentation model, it is possible to perform image processing so as to obtain a certain size by enlarging or reducing each size. Therefore, the image shown in the present embodiment is subjected to image processing by a nearest neighbor complement method such that a size of the input data set is constant.

Regions shown in the annotation data 560 and the annotation data 570 include three kinds of regions including a background 553, a mask 554, and a substrate 555. The annotation data 560 and 570 may be manually generated by using dedicated software, or may be generated by using the trained semantic segmentation model.

Next, with reference to FIG. 6, dimension places and feature points according to Embodiment 1 of the invention will be described.

FIG. 6 is a diagram showing correspondence relationships among the dimension places and the feature points according to Embodiment 1 of the invention. In an example shown in FIG. 6, dimension measurement places are set to four places including (1) L1: width of an interface between mask and substrate 606, (2) L2: width of the narrowest part of the substrate 607, (3) L3: height of the mask 608, (4) L4: depth of the trench 609. Six points A to F in the figure are feature points on a boundary line used for dimension measurement, and points that can be uniquely defined based on only boundary line data are used. For example, point A may be the highest point on an upper surface of the mask, or the like.

Definition of the feature points A to F and correspondence relationships (L1: B, C; L2: D, E, and the like) among the dimensions L1 to L4 and the feature points A to F are input by the user via the input and output device (for example, the input and output device 201 shown in FIG. 2) and stored in the database (for example, the database 105 shown in FIG. 2). In order to input the definition, the user specifies a region that is a detection target via an interface such as a mouse or a touch screen, and specifies a detection range and a detection direction within the detection range for the region. Here, the detection direction is used to specify the highest, lowest, leftmost, or rightmost coordinate in the detection range as a feature point.

In addition, as a method of inputting the definition, in a state where any of the cross-sectional SEM image is displayed on a GUI screen of the input and output device, the method may be a method in which the user specifies a feature point by clicking the feature point on the screen, or a method in which a script describing the definition of the feature point and the dimension is given. The number and positions of the feature points and the measurement dimensions may be appropriately set according to a structure of the measurement target.

Next, with reference to FIG. 7, labels in the annotation data used for training data of the semantic segmentation model according to Embodiment 1 of the invention will be described.

FIG. 7 is a table showing a correspondence relationship among a label name 710, a label number 720, and a color 730 in the annotation data used for the training data of the semantic segmentation model according to Embodiment 1 of the invention. Information shown in FIG. 7 is stored in the database (for example, the database 105 shown in FIG. 2).

A label number and a color given to each label are optional.

As shown in FIG. 7, the label name 710 of the "background" in the image corresponds to the label number 720 of "0" and the color 730 of "black", the mask corresponds to the label number 720 of "1" and "gray", and the substrate corresponds to the label number 720 of "2" and "white". The annotation data described above and images labeled by region are generated according to the information in the table shown in FIG. 7.

Next, with reference to FIG. 8, the graphical user interface (GUI) screen displayed on the input and output device according to Embodiment 1 of the invention will be described.

FIG. 8 is a diagram showing an example of a GUI screen 800 displayed on the input and output device according to Embodiment 1 of the invention. The GUI screen 800 mainly includes an annotation window 401, a model training window 402, a dimension definition window 403, and an execution window 404.

In the annotation window 401, the user can select an image file to be displayed in the annotation window 401 by using an image selection button 405. A selected image is displayed on an image window 406. Further, the user can specify an ROI 407 by operating a mouse in the displayed image. The specified ROI 407 in the image window 406 is displayed on an image window 408. Annotation data is generated based on an image of the ROI 407 displayed on the image window 408, and is displayed on an image window 409. By clicking an image pair storage button 410, the user can name the images displayed on the image window 408 and the image window 409 such that the images can be associated with each other, and store the images as a training data set.

In the model training window 402, the user can specify a data set used for the model training by clicking a data set selection button 411. Further, the user can specify the semantic segmentation model by clicking a model selection button 412. Further, by clicking a model training button 413, the user can perform the model training by using the specified data set and model. During the model training, a training result is stored appropriately. In addition, the trained model is stored with an identifiable name when the trained model is selected by a model selection button 414.

In the dimension definition window 403, the user can specify an interface between target regions by clicking a detection target button 415. Further, the user can specify a detection range 417 by clicking a detection range button 416. Further, by clicking a detection direction button 418, the user can specify a detection direction for defining an end, which is in an upper, lower, left, or right direction of the interface between the regions within the detection range 417, as a feature point. Further, the user can specify a method of calculating a dimension, based on the feature point detected based on the definition, by clicking a dimension definition button 419. Further, the user can store dimension definition as a measurement definition file by clicking a definition storage button 420.

In the execution window 404, the user can specify the trained model by clicking the model selection button 414. Further, the user can specify the measurement definition file by clicking a measurement definition selection button 421. Further, by clicking an image group selection button 422, the user can specify an image group to be measured. Further, by clicking an execution button 423, the user can use the specified trained model and the specified measurement definition file to perform measurement on each image in the image group to be measured. Thereafter, the user can output a result of the measurement as a measurement result output file to a predetermined location.

Next, with reference to FIG. 9, a test image according to the embodiment of the invention will be described.

FIG. 9 is a diagram showing an example of a test image 900 according to the embodiment of the invention. The test image is, for example, an image captured by the above-described evaluating device (for example, the evaluating device 204 shown in FIG. 2) and shows a processed semiconductor device that is the measurement object. As shown in FIG. 9, the test image 900 reflects an outline of an unnecessary inner structure, which is a structure to be ignored during the dimension measurement.

Therefore, by performing the dimension measuring method shown in FIG. 4, for example, with the test image 900 as an input image, it is possible to automatically generate a highly accurate measurement result for the cross-sectional SEM image (or the cross-sectional TEM image).

Embodiment 2

In Embodiment 1, an example of preparing the training data set in advance and generating the intermediate image including the marker indicating each region in the target image by using the semantic segmentation model is described, but the generation of the marker does not necessarily need to use the semantic segmentation model. Therefore, in Embodiment 2, a configuration will be described, in which generation of a marker is manually prepared, a newly generated region division image is added to a training data set, and estimation accuracy of a semantic segmentation model is sequentially improved.

According to the configuration, dimension measurement can be performed even when it is difficult to prepare a sufficient training data set in advance and the estimation accuracy of the model is not sufficient.

Next, with reference to FIG. 10, a dimension measuring method according to Embodiment 2 of the invention will be described.

FIG. 10 is a flowchart showing a flow of a dimension measuring method 1000 according to Embodiment 2 of the invention.

First, in step S200, a training unit (for example, the training unit 206 shown in FIG. 2) confirms whether there is a training data set in a database (for example, the training unit 206 shown in FIG. 2).

In a case where there is a training data set, next, in step S201, the training unit transfers the training data set and a machine learning model from the database to the first region dividing unit (for example, the first region dividing unit 102 shown in FIG. 2), and causes the machine learning model to learn. Parameters of the trained model are returned and stored in the database.

The "machine learning model" here is described by taking a neural network having a convolutional layer, a dropout layer, and the like as an example, but the invention is not limited thereto, and may be a machine learning model such as a decision tree.

Next, in step S202, the first region dividing unit receives the input image, in which the measurement object is reflected, from the input and output device.

Next, in step S203, the first region dividing unit obtains the machine learning model and trained parameters from the database, and specifies a target region in the input image by using the ROI detection algorithm based on the obtained model and trained parameters.

Here, an example of using Template Matching as the ROI detection algorithm will be described, but the invention is not limited thereto, and it is also possible to use a deep learning model, such as a region proposal network (RPN), and a machine learning model based on a feature amount such as a Haar-Like feature classifier.

Next, in step S204, the first region dividing unit confirms whether there is a trained model in the database. In a case where there is a trained model, in step S205, the first region dividing unit estimates on the detected ROI using the semantic segmentation model. In a case where there is no trained model in the database, the first region dividing unit does not perform estimation using the model, and the processing proceeds to step S208.

Next, in a case where the estimation using the model is performed in the first region dividing unit, in step S206, the second region dividing unit (for example, the second region dividing unit 103 shown in FIG. 2) generates an image including a marker indicating each region in the input image as an intermediate image based on an estimation result generated in step S204. Here, the "marker" is information representing a region with confirmation and a region without confirmation in the so-called Watershed algorithm.

The estimation result obtained by semantic segmentation performed in the first region dividing unit is array information labeled for each pixel, and the second region dividing unit generates a marker according to the number of label types and generates the intermediate image.

Specifically, when there is one label type, that is, when the estimation result obtained by the semantic segmentation model is determined to be the same for all pixels, since there is no interface to be detected in the detected ROI, the processing proceeds to the next step.

When the number of label types is two, it is determined that the image is an image in which a foreground and a background are separated. A new boundary region is generated near a boundary line between the foreground and the background by performing predetermined region reduction processing on regions of the foreground and the background, the reduced foreground and background are defined as regions with confirmation, and the newly generated boundary region is defined as a region without confirmation.

Here, in the region reduction processing, an algorithm for reducing ten pixels from the outermost periphery of each region may be used, but the invention is not limited thereto.

Next, in step S207, the second region dividing unit performs region division by the Watershed algorithm based on the image generated in step S203 and in which the target region is specified, and the intermediate image generated in step S206.

Here, when the number of label types is three or more, the second region dividing unit treats an aimed label as the foreground and treats all other labels as the background, and the same processing as in the case where the number of label types is two is performed until the aimed label is covered.

Next, in a case where the estimation using the model is not performed, in step S208, the user generates the intermediate image including the marker by operating a mouse or the like.

Next, in step S209, the second region dividing unit determines whether there is another specified region in the input image. When there is another specified region in the input image, the second region dividing unit repeats the above-described processing for the remaining specified region. Specifically, the second region dividing unit performs the generation of the marker indicating the region and the region division on each specified region, and performs until all the specified regions are covered.

Next, in step S210, the generated region division image is added to the training data set and appropriately stored in the database. Accordingly, in subsequent machine learning training, the training unit can perform training of the semantic segmentation model using the updated training data set and improve the estimation accuracy of the model.

In a case where there is no other specified region in the input image, the processing proceeds to step S211.

Next, in step S211, the dimension measuring unit confirms whether definition of a feature point and a dimension that defines dimension conditions of a measurement target is stored in advance in the database. If these pieces of information are not stored in the database, the dimension measuring unit proceeds to step S212 and specifies a region label that is a detection target, a detection range, and a detection direction.

When specifying a plurality of places, the dimension measuring unit specifies definition for each feature point.

Next, in step S213, the dimension measuring unit performs detection of the feature point based on the specified definition.

Next, in step S214, the dimension measuring unit performs processing of measuring a dimension of the measurement object based on the obtained feature point, and converts the measured dimension information from a pixel unit to an actual unit.

Next, with reference to FIG. 11, a graphical user interface (GUI) screen displayed on the input and output device according to Embodiment 2 of the invention will be described.

FIG. 11 is a diagram showing an example of a GUI screen 1100 displayed on the input and output device according to Embodiment 2 of the invention. As shown in FIG. 11, the GUI screen 1100 includes a region division window 501, a dimension definition window 502, and an execution window 503.

In the region division window 501, the user can select an image file to be displayed in the region division window 501 by clicking an input image selection button 504. A selected image is displayed on an image window 505. In a case where a specific ROI is registered in advance, the ROI is read from the database (for example, the database 105 shown in FIG. 2), while in a case where the specific ROI is not registered or is desired to be changed, the user can specify the ROI by operating the mouse in the displayed image and register the ROI by clicking a ROI registration button 506.

Further, by clicking a region specification button 507, the user can specify a region by using the ROI detection algorithm. A detected ROI 508 is displayed on the image window 505. When the detected ROI 508 is incorrect, the user can update the ROI by clicking the ROI registration button 506. Further, by clicking a region division button 509, the user can perform region division on each detected ROI 508 by using a selected semantic segmentation model in advance. When the semantic segmentation model is not selected in advance, or when the semantic segmentation model or the like to be used is desired to be changed, the user can select the model by clicking a model selection button 510.

Further, a region division result is displayed on an image window 511. In a case where the region division result is not sufficient, by clicking a model update button 512, the user can update the trained semantic segmentation model, or adjust a reduction amount 513 and update a marker to be used for the Watershed algorithm.

In the present embodiment, the Watershed algorithm is used as an example, but the invention is not limited thereto, and it is also possible to use an algorithm such as a Graph cut algorithm that performs region division based on other luminance information instead. In a case where the region division result is sufficient, the user can add the region division image to the database 105 by clicking a data addition button 524.

In the dimension definition window 502, the user can specify an interface between target regions by clicking a detection target button 514. Further, the user can specify a detection range 516 by using a detection range button 515. Further, by clicking a detection direction button 517, the user can specify a detection direction for defining an end, which is in an upper, lower, left, or right direction of the interface between the regions within the detection range 516, as a feature point. Further, the user can specify a method of calculating a dimension, based on the feature point detected based on the definition, by clicking a dimension definition button 518. Further, the user can store dimension definition as a measurement definition file by clicking a definition storage button 519.

In the execution window 503, the user can specify a trained model by clicking a model selection button 520. Further, the user can specify the measurement definition file by clicking a measurement definition selection button 521. Further, by clicking an image group selection button 522, the user can specify an image group to be measured. Further, by clicking an execution button 523, the user can use the specified trained model and the specified measurement definition file to perform measurement on each image in the image group to be measured. Thereafter, the user can output a result of the measurement as a measurement result output file to a predetermined location.

Although the embodiments of the invention have been described above, the invention is not limited to the embodiments described above, and various modifications can be made without departing from the scope of the invention.

REFERENCE SIGN LIST

100: dimension measuring device
101: central processing unit
102: first region dividing unit
103: second region dividing unit
104: dimension measuring unit
105: database
106: neural network
201: input and output device
202: input information
203: processing device
204: evaluating device
205: cross-sectional image
401: annotation window
402: model training window 403: dimension definition window
404: execution window
405: image selection button
406: image window
407: ROI
408: image window
409: image window
410: image pair storage button
411: data set selection button
412: model selection button
413: model training button
414: model selection button
415: detection target button
416: detection range button
417: detection range
418: detection direction button
419: dimension definition button
420: definition storage button
421: measurement definition selection button
422: image group selection button
423: execution button
501: region division window
502: dimension definition window
503: execution window
504: input image selection button
505: image window
506: ROI registration button
507: region specification button
508: ROI
509: region division button
510: model selection button
511: image window
512: model update button
513: reduction amount
514: detection target button
515: detection range button
516: detection range
517: detection direction button
518: dimension definition button
519: definition storage button
520: model selection button
551: cross-sectional SEM image
552: cross-sectional SEM image
553: background
554: mask
555: substrate
606: width of interface between mask and substrate
607: width of narrowest part of substrate
608: height of mask
609: depth of trench
521: measurement definition selection button
522: image group selection button
523: execution button
524: data addition button

The invention claimed is:

1. A dimension measuring device comprising:
a processor configured to measure a dimension of a predetermined point in a shape of an etched film that has undergone etching using an image showing the shape of the etched film that has undergone etching, wherein
a first image in which each region of the image showing the shape of the etched film that has undergone etching is labeled by region is generated by machine learning,
an intermediate image including a marker indicating each region of the first image is generated based on the generated first image,
a second image in which each region of the image showing the shape of the etched film that has undergone etching is labeled by region is generated based on the image showing the shape of the etched film that has undergone etching and the generated intermediate image by an image processing based on luminance information,
coordinates of a boundary line between adjacent regions are obtained by using the generated second image,
coordinates of a feature point that defines a dimension of the predetermined point in the shape of the etched film that has undergone etching are obtained by using the obtained coordinates of the boundary line, and
the processor is further configured to measure the dimension of the predetermined point in the shape of the etched film that has undergone etching using the obtained coordinates of the feature point.

2. The dimension measuring device according to claim 1, wherein
the intermediate image is an image showing a region in which each region of the first image is redefined by enlargement processing or reduction processing.

3. The dimension measuring device according to claim 1, wherein
the coordinates of the feature point are obtained based on a detection target of the feature point defined with respect to the obtained coordinates of the boundary line, a detection range of the feature point defined with respect to the obtained coordinates of the boundary line, and a detection direction of the feature point defined with respect to the obtained coordinates of the boundary line.

4. The dimension measuring device according to claim 1, wherein
the machine learning is a semantic segmentation method using deep learning.

5. The dimension measuring device according to claim 4, wherein
the image processing based on the luminance information is a process that uses a Watershed conversion algorithm or a Graph cut algorithm.

6. The dimension measuring device according to claim 1, wherein
the image showing the shape of the etched film that has undergone etching is a cross-sectional scanning electron microscope (SEM) image.

7. The dimension measuring device according to claim 1, wherein
the image showing the shape of the etched film that has undergone etching is a transmission electron microscope (TEM) image.

8. A semiconductor device manufacturing system, comprising:
a semiconductor manufacturing device in which a sample formed with an etched film is processed;
an evaluating device in which a shape of the etched film that has undergone etching by the semiconductor manufacturing device is captured as an image; and
a dimension measuring device that measures a dimension of a predetermined point in the shape of the etched film that has undergone etching by using the image captured by the evaluating device as an input image, wherein
the processing device, the evaluating device, and the dimension measuring device are connected via a network, and the dimension measuring device is configured to
generate a first image in which each region of the input image is labeled by region by machine learning,
generate an intermediate image including a marker indicating each region of the first image based on the generated first image,
generate a second image in which each region of the input image is labeled by region based on the input image and the generated intermediate image by an image processing based on luminance information,
obtain coordinates of a boundary line between adjacent regions by using the generated second image,
obtain coordinates of a feature point that defines a dimension of the predetermined point in the shape of the etched film that has undergone etching by using the obtained coordinates of the boundary line, and
measure the dimension of the predetermined point in the shape of the etched film that has undergone etching by using the obtained coordinates of the feature point.

9. The semiconductor device manufacturing system according to claim 8, wherein
the semiconductor manufacturing device is a plasma etching device, and
the evaluating device is a cross-sectional SEM device.

10. A dimension measuring method for measuring a dimension of a predetermined point in a shape of an etched film that has undergone etching using an image showing the shape of the etched film that has undergone etching, the method comprising:
a step of generating a first image in which each region of the image showing the shape of the etched film that has undergone etching is labeled by region by machine learning;
a step of generating an intermediate image including a marker indicating each region of the first image based on the generated first image;
a step of generating a second image in which each region of the image showing the shape of the etched film that has undergone etching is labeled by region based on the image showing the shape of the etched film that has undergone etching and the generated intermediate image based on luminance information;
a step of obtaining coordinates of a boundary line between adjacent regions by using the generated second image;
a step of obtaining, by using the obtained coordinates of the boundary line, coordinates of a feature point that defines a dimension of the predetermined point in the shape of the etched film that has undergone etching; and
a step of obtaining the dimension of the predetermined point in the shape of the etched film that has undergone etching by using the obtained coordinates of the feature point.

* * * * *